Figure 1:
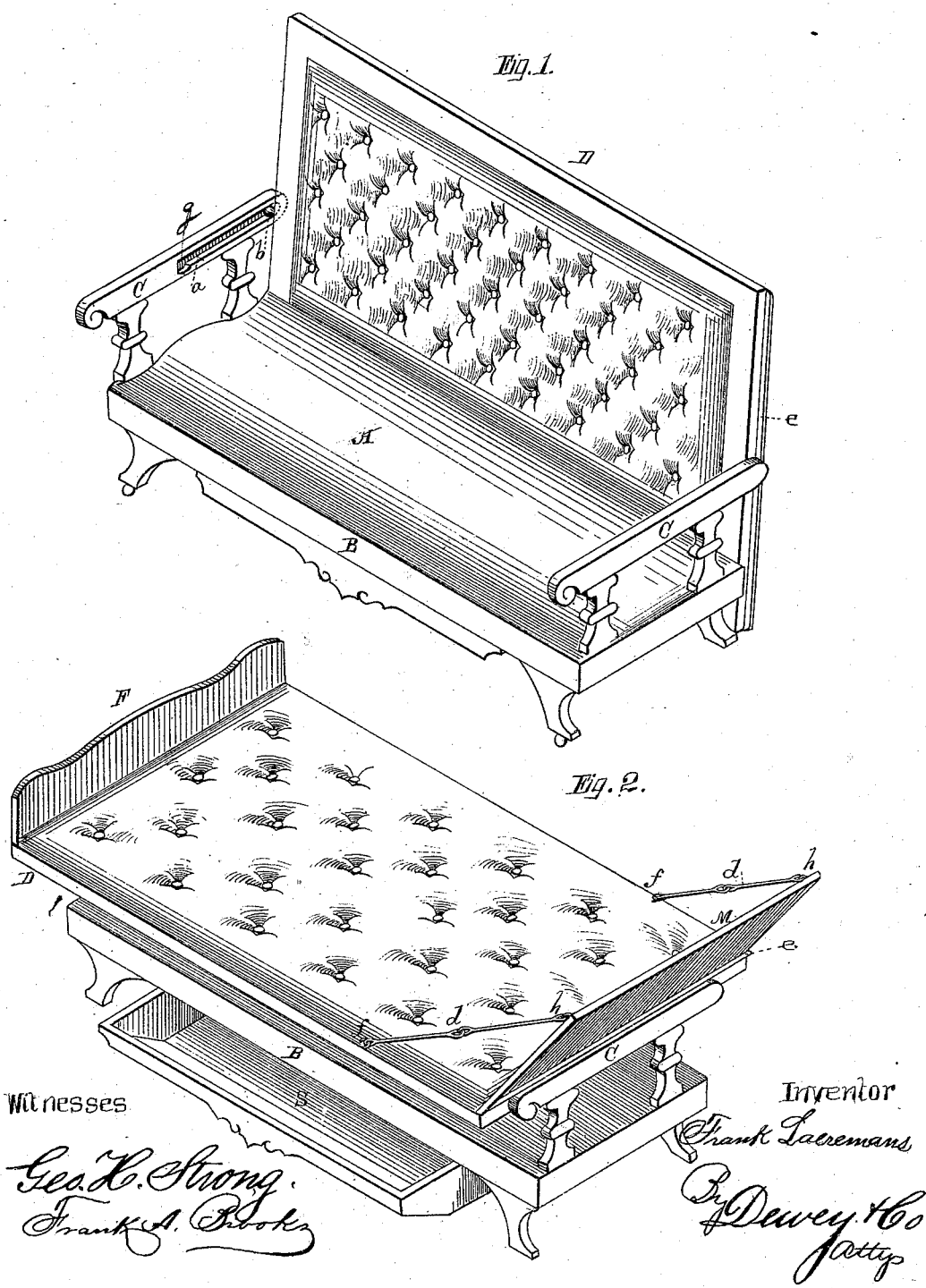
Figure 2:
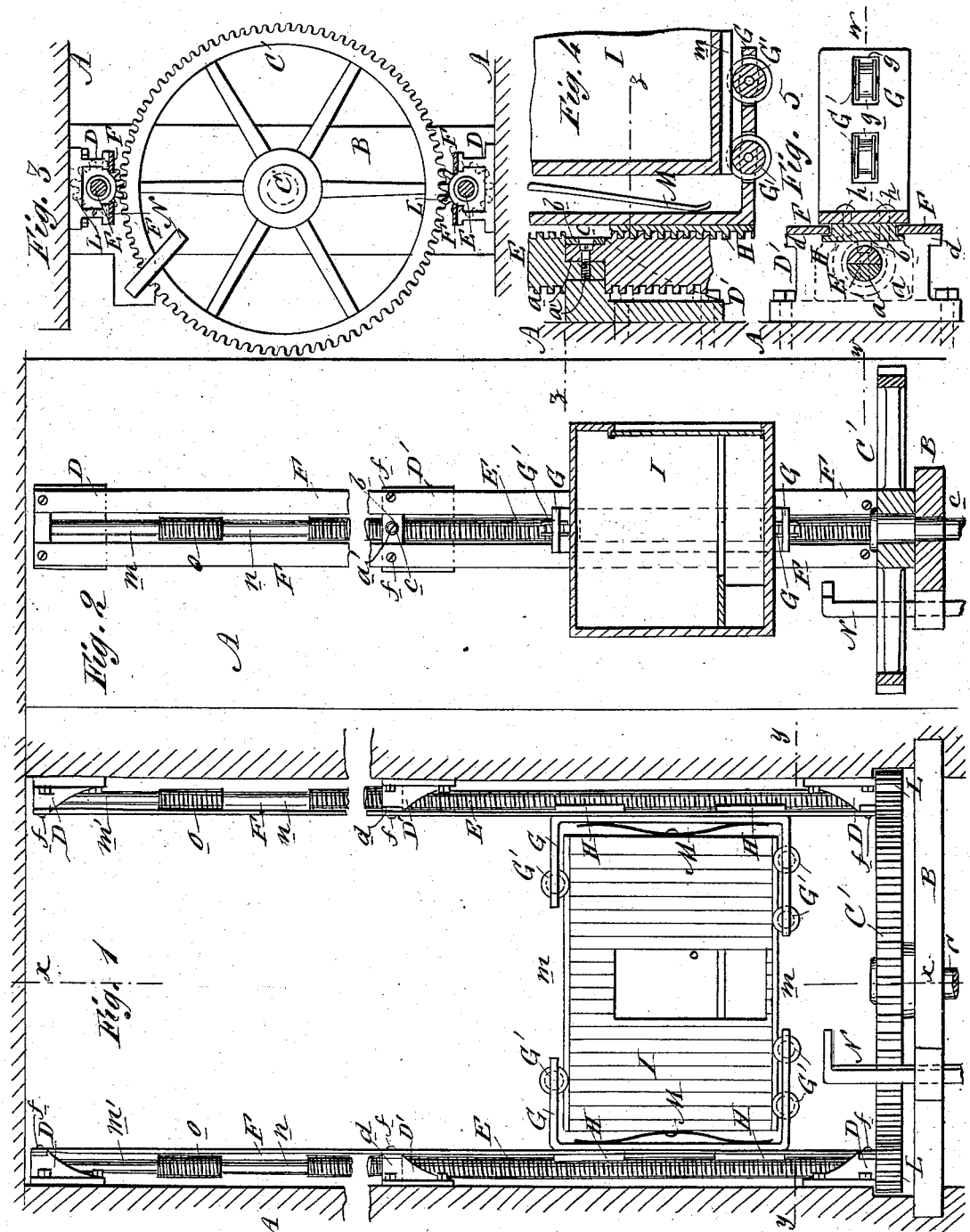
Figure 3:
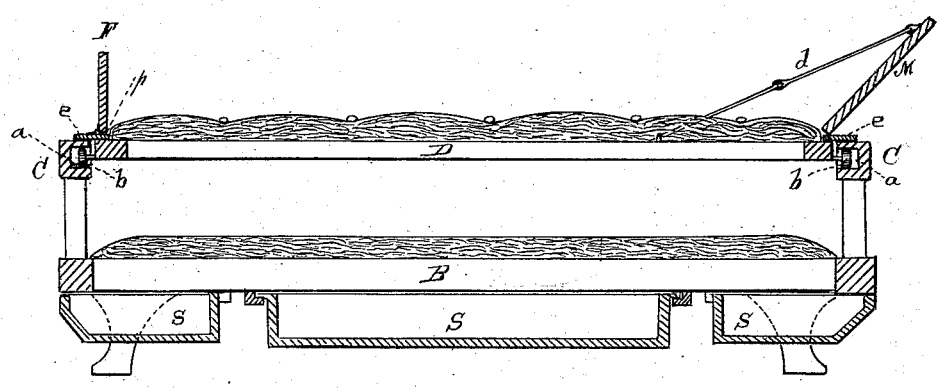
Figure 4:
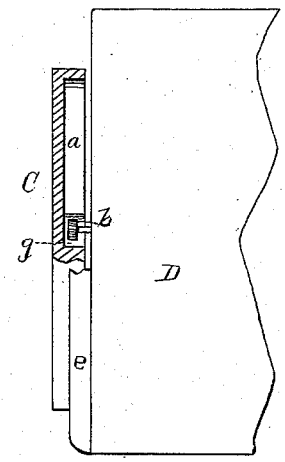

(No Model.) 2 Sheets—Sheet 1.

F. LAEREMANS.
Sofa Bed.

No. 242,941. Patented June 14, 1881.

Witnesses
Geo. H. Strong.
Frank A. Brooks.

Inventor
Frank Laeremans,
By Dewey & Co
Attys (No Model.) 2 Sheets—Sheet 2.

F. LAEREMANS.
Sofa Bed.

No. 242,941. Patented June 14, 1881.

Witnesses
Geo. H. Strong.
Frank A. Brooks

Inventor
Frank Laeremans
By Dewey & Co.
Attys